United States Patent [19]

Triantafilou et al.

[11] Patent Number: 4,896,760
[45] Date of Patent: Jan. 30, 1990

[54] PUSHER ELEMENTS AND CROSS TUBES FOR A SORTATION CONVEYOR FOR PRODUCTS WITH HIGH-FRICTION SURFACES

[75] Inventors: George M. Triantafilou; Thomas C. Yu; Robert R. Babel, all of Cincinnati, Ohio

[73] Assignee: The Buschman Company, Cincinnati, Ohio

[21] Appl. No.: 298,521

[22] Filed: Jan. 18, 1989

[51] Int. Cl.[4] .............................................. B65G 47/46
[52] U.S. Cl. ..................................... 198/365; 198/372
[58] Field of Search ............... 198/365, 370, 372, 440, 198/456, 802; 209/651, 653

[56] References Cited

U.S. PATENT DOCUMENTS

| | | | |
|---|---|---|---|
| 4,711,341 | 12/1987 | Yu et al. | 198/372 |
| 4,738,347 | 4/1988 | Brouwer et al. | 198/372 |
| 4,760,908 | 8/1988 | Houghton | 198/372 |

Primary Examiner—Joseph E. Valenza
Attorney, Agent, or Firm—Frost & Jacobs

[57] ABSTRACT

A sortation conveyor for packages and products comprising a frame defining a main line of the conveyor and at least one branch outlet extending laterally therefrom. An endless conveying apron is supported for movement on the frame along the main line. The apron comprises a pair of endless chains joined together by a plurality of cross tubes affixed to the chains and extending transversely of the frame in parallel spaced relationship. A pusher element is slidably mounted on and between each adjacent pair of cross tubes throughout the length of the apron. The pusher elements are moveable with and by the apron in the conveying direction. Diverter structure is provided for shifting a desired number of pusher elements transversely of the apron along those cross tubes to which they are mounted to divert a desired package or product onto the branch outlet. A low-friction layer is located on each of the cross tubes and a package or product contacting cap is located on each of the pusher elements. Each cap has at least one package or product contacting surface sloping upwardly and inwardly of the cap to impart to the package or product a lifting force as well as a horizontal force such that the weight of the package or product on the cross tubes and thus the sliding friction forces are reduced, whereby the sortation conveyor can accommodate products with high-friction surfaces.

24 Claims, 7 Drawing Sheets

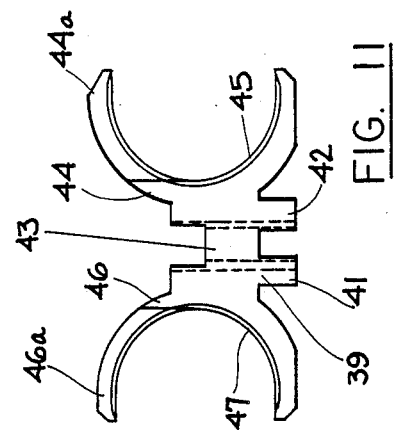
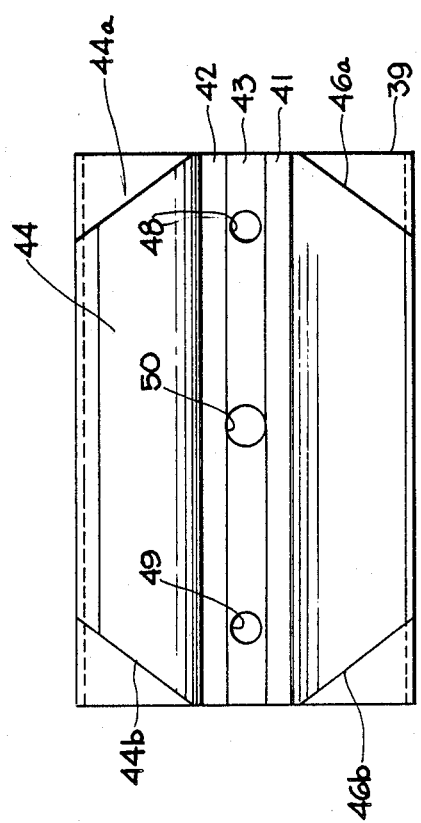
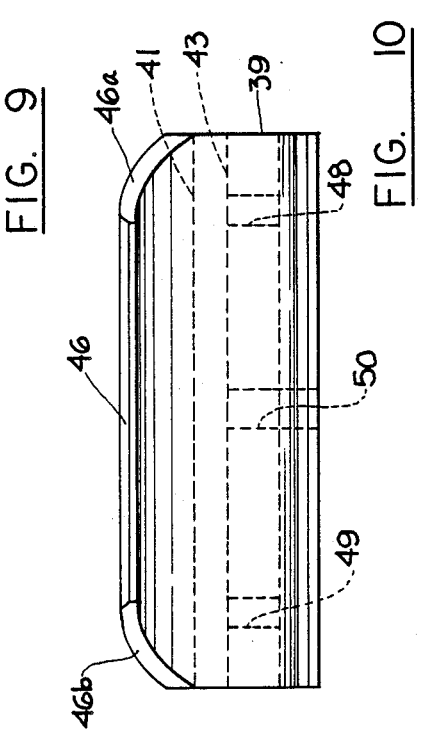

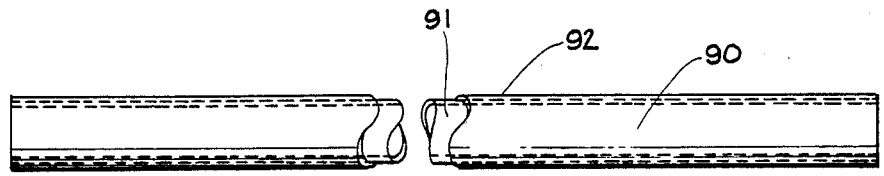
FIG. 17
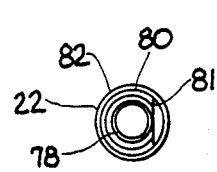
FIG. 13
(PRIOR ART)
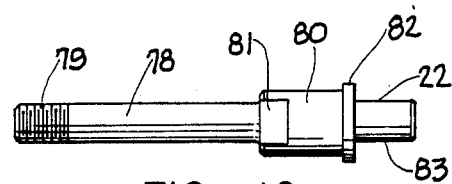
FIG. 12
(PRIOR ART)
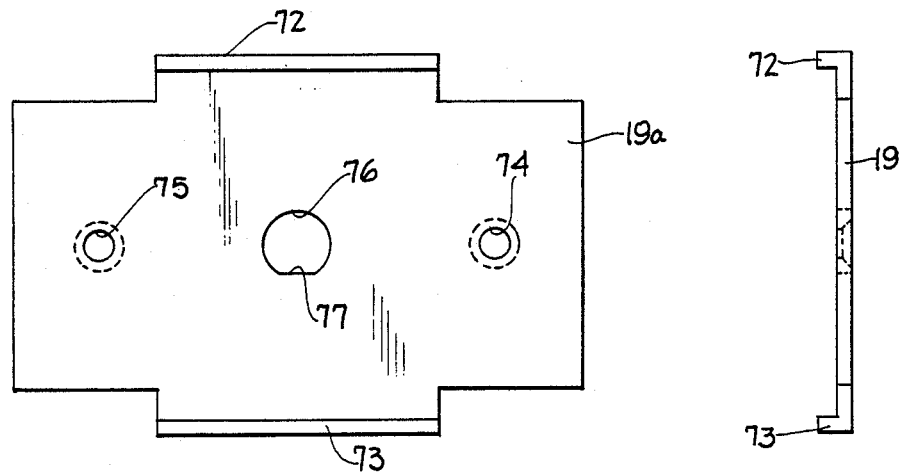
FIG. 14
(PRIOR ART)
FIG. 15
(PRIOR ART)

PUSHER ELEMENTS AND CROSS TUBES FOR A SORTATION CONVEYOR FOR PRODUCTS WITH HIGH-FRICTION SURFACES

TECHNICAL FIELD

The invention relates to a package or product sortation conveyor, and more particularly to such a conveyor provided with improved pusher elements and cross tubes for the handling of products with high-friction surfaces.

BACKGROUND ART

The invention relates to product sortation conveyors of the general type taught, for example, in U.S. Pat. No. 4,711,341. Briefly, a product sortation conveyor comprises a frame defining a main line of the conveyor together with one or more branch outlets extending laterally therefrom along one or both sides thereof.

An endless conveying surface or apron is supported for movement on the frame and is characterized by a top conveying flight or run and a bottom return flight or run. The apron comprises a pair of endless roller chains, selected links of which are joined together by transversely extending cross tubes arranged in parallel spaced relationship. A plurality of pusher elements are provided, each pusher element mounted on a pair of adjacent cross tubes throughout the length of the apron. As a consequence, the number of pusher elements on the apron is equal to one-half the number of cross tubes making up the continuous apron. Each pusher element not only travels with the apron in the general conveying direction, but also is adapted for sliding movement across the apron from one side thereof to the other. Means are further provided for causing a desired number of pusher elements to move across the apron as they move forwardly with it, to push a selected product from the apron onto a selected branch outlet.

Sortation conveyors of the type just described can be used with many types of products and packages. They are capable of faultless sortation and can be operated at relatively high rates of speed. Such sortation conveyors are provided with numerous safety devices to assure proper operation and to shut down the conveyor before damage thereto or to the products thereon, should a problem arise.

Sortation problems have been encountered, however, when such conveyors carry Products or packages characterized by high-friction surfaces. Rubber vehicular tires constitute a prime example of products with high-friction surfaces.

In the conveying of rubber vehicular tires on a sortation conveyor of the type taught in U.S. Pat. No. 4,711,341, it was found that the high-friction surfaces of the tires when pushed along the steel cross tubes during a diverting operation caused the tires to chatter or bounce while being diverted by the pusher elements. This chatter effect was so great that approximately one out of ten tires would bounce its way over the pusher element and would not properly divert. Those tires that did divert, appeared to be partially resting on top of the pusher elements and chattered throughout the diverting operation.

When the tires were introduced to the sortation conveyor directly from their molds, so that the side walls of the tires were at an elevated temperature of from about 85° F. to about 135° F. and were very clean, the chatter effect was augmented. Furthermore, the tires being relatively soft, were easily distorted and some became pinched between the pusher elements and their respective cross tubes. Yet another problem was the accumulation of foreign material on the cross tubes, such as rubber flashings, which would interfere with the smooth movement of the pusher elements along their respective cross tubes.

The present invention is based upon the discovery that, with appropriate modifications to the cross tubes and pusher elements, the above-noted problems can be eliminated and products with high-friction surfaces can be properly processed on a sortation conveyor and diverted to one or more branch outlets, as desired.

To this end, the pusher element cap (i.e., that part of each pusher element that contacts the product) was completely redesigned with respect to contour with its height approximately doubled. That surface of the pusher element cap which contacts the tire is inclined upwardly and rearwardly with respect to the direction of diverting and designed to provide a larger contact area to prevent excessive deflection of the tire. The inclined surface applies a lifting force, as well as a horizontal force, to the tire, thereby reducing the weight on the cross tubes which, in turn, reduces the sliding friction forces. The inclined contour also provides a downward force, generated by the tire itself, to hold the pusher element tightly against its respective cross tubes, eliminating the tendency of the higher or taller contour to lift the cross tubes out of their normal operating position. The pusher elements inclined operating surface extends to a position below the uppermost surface of the cross tubes, which is below the conveying surface of the tire. This, in conjunction with the larger contacting surface, minimize deflection, eliminating pinching or binding effects of the tire between the pusher element and its respective cross tubes. The improved pusher elements also enable the sorting of products with a high center of gravity.

In conjunction with the improved pusher elements, the cross tubes of the present invention are coated with a low-friction material having excellent release characteristics and precluding the adhesion of foreign matter on the surfaces of the cross tubes. The frictional forces between the tire and the cross tubes are greatly reduced providing positive sort capabilities for high-friction products. The coating eliminates marking of the tire, such as scratches, as the tire slides on the cross tubes. The coating also renders the cross tubes resistant to corrosion. Chattering or bouncing of the tires during a diverting operation is substantially reduced or eliminated. The steel of the cross tubes provides strength and rigidity, while the coating thereon provides low-friction.

DISCLOSURE OF THE INVENTION

According to the invention improved pusher elements and cross tubes are provided for a sortation conveyor enabling packages or products having high-friction surfaces to be sorted thereon. Sortation conveyor are known per se, and generally comprise a frame defining a main line of the conveyor and at least one branch outlet extending from at least one side thereof. The main line portion of the frame supports an endless conveying means or apron comprising a pair of endless chains in parallel spaced relationship with their links joined by a plurality of cross tubes affixed to the links and extending transversely of the frame. For adequate strength, the cross tubes are made of steel.

Each adjacent pair of cross tubes supports a pusher element for movement with the apron in the general conveying direction, and for sliding movement, on the supporting cross tubes, across the apron from one side thereof to the other. Means are provided for causing a desired number of pusher elements to move across the apron as they move forwardly with it to push a selected package or product from the apron onto a branch outlet.

According to the present invention, each of the steel cross tubes is provided with a low-friction layer or coating which enables high-friction packages or products to shift therealong without friction induced chatter or bouncing. The coating or layer also has excellent release characteristics precluding adhesion of foreign material on the cross tubes, which otherwise would interfere with the movement therealong of the pusher elements supported thereby. The coating or layer also eliminates marking of the package or product as it slides along the cross tubes and tends to protect the cross tubes from corrosion.

The cap or upstanding portion of each pusher, which engages the package or product to be diverted, has been redesigned to be taller. The primary package or product engaging surface of the pusher cap is inclined upwardly and rearwardly with the respect to the diverting direction. The primary package contacting surface of the pusher cap provides a larger contact surface area and creates a lifting effect on the package or product, reducing the weight of the package or product on the cross tubes thereby reducing sliding friction forces. The inclined package or product contacting surface provides a downward force, generated by the product or package, to hold the pusher tightly against its respective cross tubes overcoming the tendency of the high contour to lift the slats out of their normal operating positions. The inclined surface of the pusher cap extends to a position below the conveying surface of the cross tubes which, in conjunction with the larger contacting surface, minimizes deflection of the package or product and eliminates pinching or binding of the product or package between the pusher cap and the cross tubes.

BRIEF DESCRIPTION OF THE DRAWINGS

FIG. 9 is a plan view of a base of a pusher element of the present invention.

FIG. 10 is a rear elevational view of the base of FIG. 9.

FIG. 11 is an end elevational view of the base of FIG. 10, as seen from the right of that figure.

FIG. 12 is an elevational view of a pusher element guide pin.

FIG. 13 is an end elevational view of the pusher guide pin of FIG. 12, as seen from the left of that figure.

FIG. 14 is a plan view of a pusher element stiffener plate.

FIG. 15 is an end elevational view of the stiffener plate of FIG. 14, as seen from the right of that figure.

FIG. 17 is a fragmentary elevational view of a cross tube of the present invention.

DETAILED DESCRIPTION OF THE INVENTION

Figure 1:
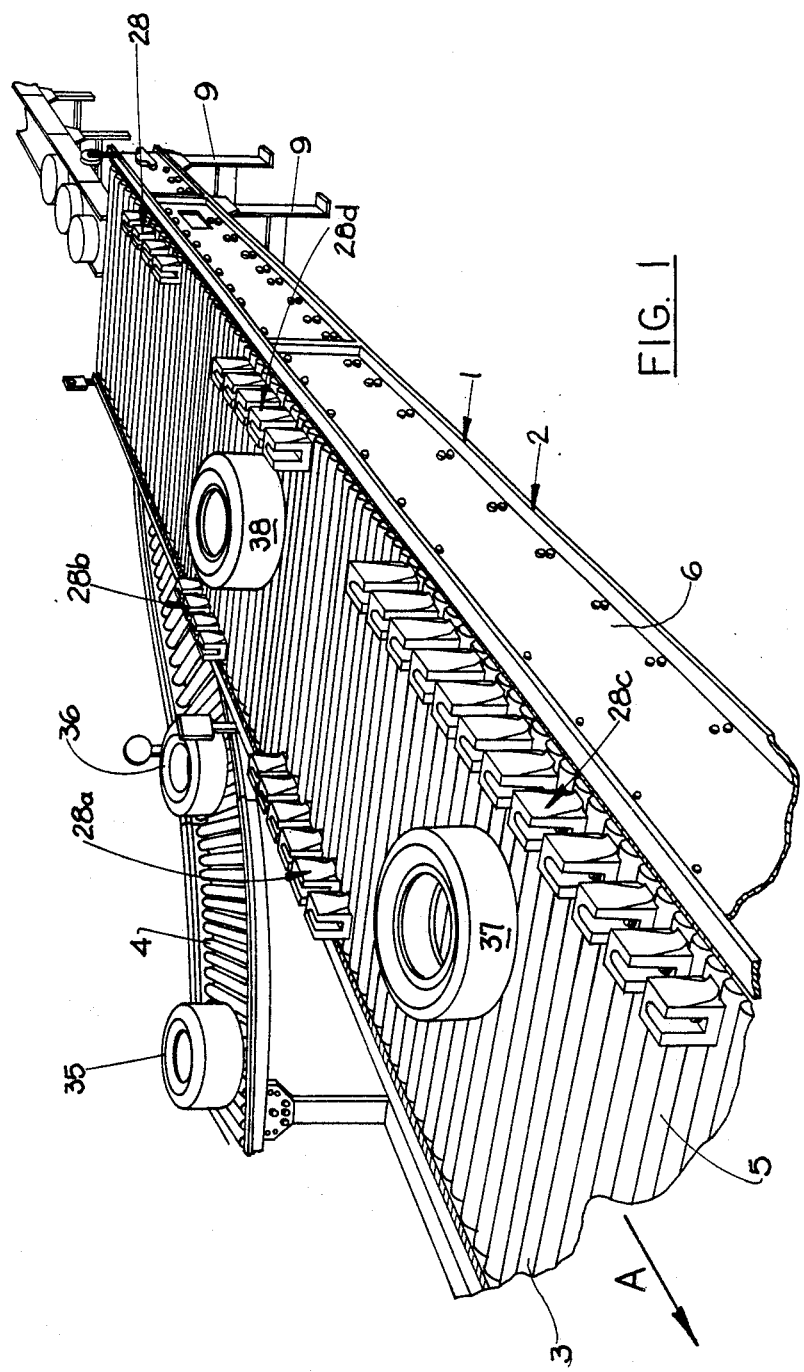
FIG. 1 is a fragmentary perspective view illustrating a conventional sortation conveyor provided with the cross tubes and pusher elements of the present invention.
Figure 2:
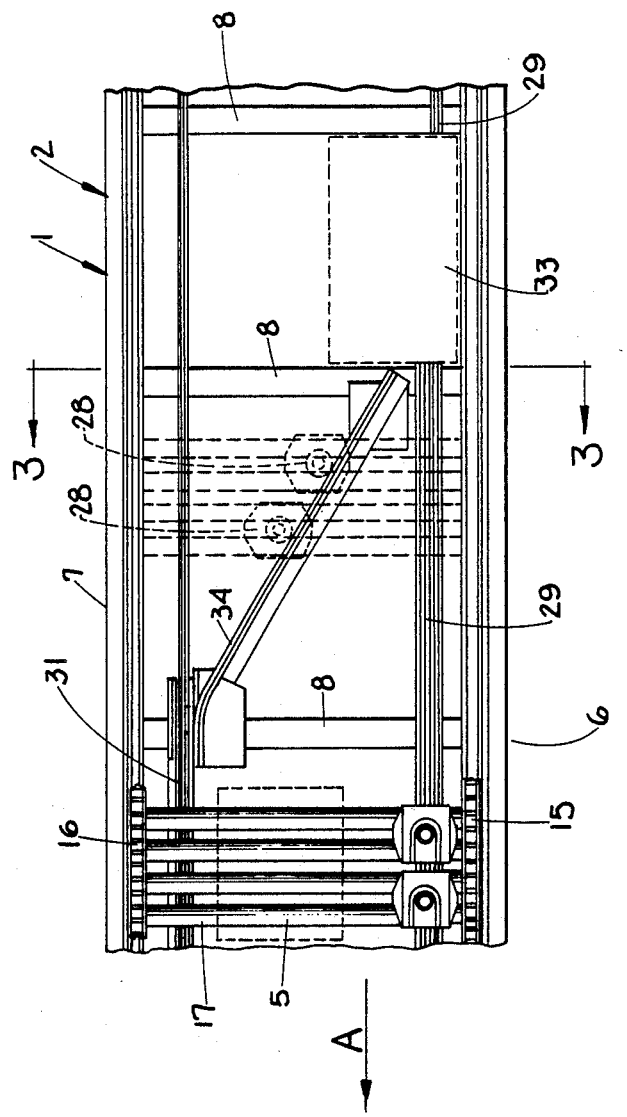
FIG. 2 is a fragmentary, simplified, plan view of a portion of the conveyor of FIG. 1.
Figure 3:
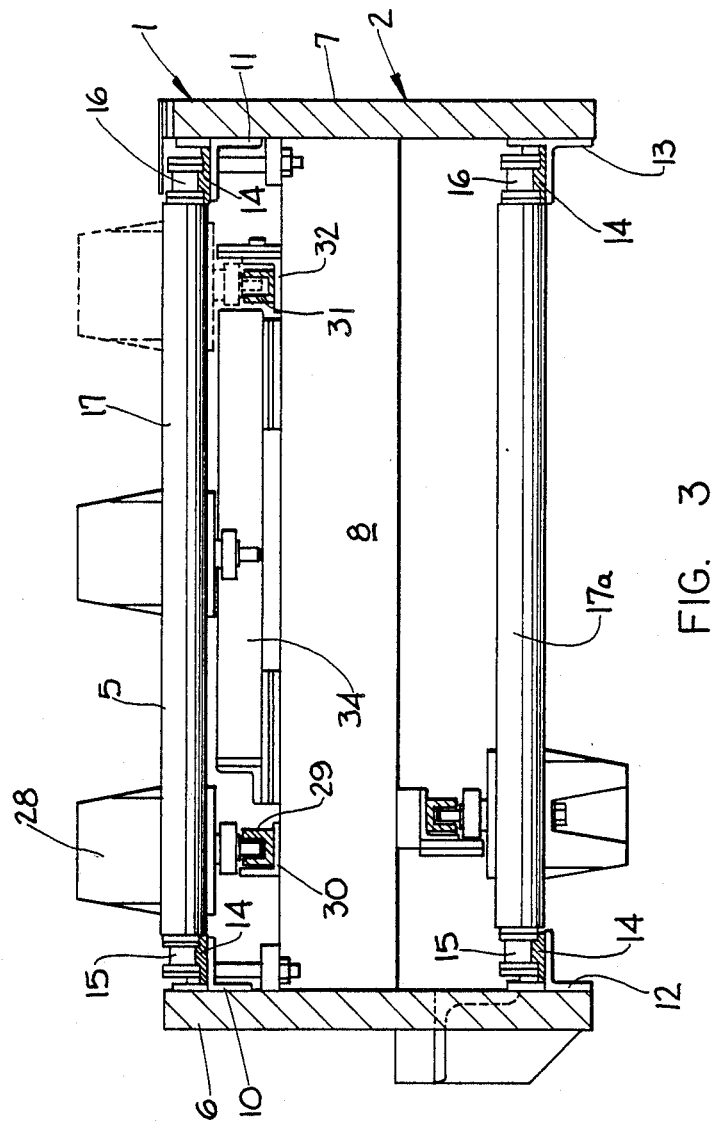
FIG. 3 is a simplified cross sectional view taken along line 3—3 of FIG. 2.

FIGS. 1, 2 and 3, wherein like parts have been given like index numerals, illustrate a sortation conveyor of the type taught in U.S. Pat. No. 4,711,341 provided with cross tube and pusher elements of the present invention.

The teachings of U.S. Pat. No. 4,711,341 are incorporated herein by reference. Briefly, this patent describes a sortation conveyor generally indicated at 1. The sortation conveyor comprises a frame, generally indicated at 2, defining a main line 3 of the conveyor and at least one branch outlet 4 extending therefrom. It will be understood by one skilled in the art that the sortation conveyor 1 could have more than one branch outlet, extending from either side of main line 3.

The main line 3 has an endless conveying means or apron 5 for movement on frame 1 in the direction of arrow A.

As is shown in FIGS. 1-3, the frame 1 is made up of side plates 6 and 7 joined together in parallel spaced relationship by cross braces 8. This structure is, in turn, mounted on leg elements 9.

The side plates 6 and 7 have angle members 10 and 11, respectively, affixed to their inside surfaces near the top edges thereof. Similarly, the side plates 6 and 7 have angle members 12 and 13, respectively, affixed to their inside surfaces near the bottom edge thereof. Angle members 10-13 support guides 14 for the apron 5.

As is most clearly shown in FIGS. 2 and 3, the apron 5 comprises a pair of endless roller chains 15 and 16, joined together by a plurality of cross tubes 17. The cross tubes 17 are carried by the roller chains 15 and 16 in parallel spaced relationship, extending transversely of frame 1. As is most clearly shown in FIG. 3, the roller chains 15 and 16 engage and are directed by guides 4. At the rearward end of the sortation conveyor, the endless roller chains 15 and 16 pass about a pair of sprockets (not shown) mounted on an idler shaft (not shown) rotatively supported by frame 1. At the forward end of the sortation conveyor, the endless roller chains 15 and 16 pass about sprockets (not shown) mounted on a driven shaft (not shown). In this way, the apron 5 is caused to travel in the direction of Arrow A (see FIG. 1). Since the apron 5 is endless, it will have an upper conveying run or flight 17 and a lower return run or flight 17a. U.S. Pat. No. 4,711,341 teaches that the cross tubes 17 are formed of steel for adequate strength.

Figure 4:
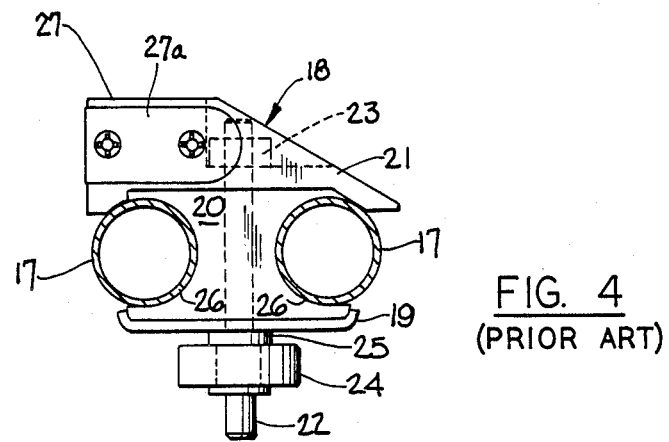
FIG. 4 is a side elevational view of a prior art pusher element assembly.

Reference is now made to FIG. 4 wherein a prior art pusher element of the type taught in U.S. Pat. No. 4,711,341 is illustrated. The prior art pusher element is generally indicated at 18 and comprises a stiffener plate 19, a base 20, and a pusher cap 21. This assembly is held together by a pair of bolts (not shown) which extend through the stiffener plate 19, base 20 and cap 21 and are provided with nuts. The assembly is further held together by a guide pin 22 which also passes through the stiffener plate 19, base 20 and pusher cap 21. The guide pin 22 is threaded at its upper end and provided with a nut 23. The guide pin 22 carries a roller type bearing member 24 and a spacer 25.

The base 20 lends itself well to being molded of plastic material having good anti-friction properties such as ultrahigh-molecular-weight polyethylene (hereinafter referred to as UHMWPE). The base 20 is generally I-shaped in cross section with its opposite sides rounded to provide a pair of semi-cylindrical recesses 26 which constitute slideways proportioned to be received between and slide on a pair of adjacent cross tubes 17, the recesses 26 are of a diameter slightly larger than the outside diameter of the cross tubes so that there is essentially a line contact between the two.

The cap 21 of pusher member assembly 18 may also be formed of acrylonitrile butadiene styrene (ABS). The cap 21 is a relatively low member, the back corners of which are beveled. One such beveled corner is shown at 27. Depending upon the direction of diversion transverse apron 5, one of the rearward beveled corners will make face-to-face contact with the product being diverted. The beveled corner 27 is recessed to receive a complimentary shaped bumper 27a of high-friction plastic material such as urethane. The other corner will similarly be provided with a bumper.

In FIGS. 1, 2 and 3 the sortation conveyor 1 is illustrated as being provided with the improved pusher elements 28 of the present invention. The basic movements of the pusher elements, next to be described, are the same for both the new pusher elements 28 of the present invention and the prior art pusher elements 18 (see FIG. 4). As will be set forth in detail hereinafter, the new pusher elements 28 of the present invention are provided with base members substantially similar to the base member 20 of FIG. 4, by which they are mounted on pairs of adjacent cross tubes. Furthermore, each pusher element 28 of the present invention is provided with a pin and a roller type bearing member substantially identical to pin 22 and bearing member 24 of FIG. 4. As a consequence, those parts of the new bearing element 28 of the present invention which are substantially the same as the equivalent parts of the prior art pusher element 18 have been given the same index numeral.

In the exemplary embodiment illustrated in FIG. 1, the sortation conveyor is shown as having one branch outlet 4 extending to the right of main line 3, as viewed in the direction of travel A. As indicated above, the sortation conveyor 1 could have more than one branch outlet and they could extend either to the right or to the left of main line 3, or to both sides. Where the branch outlets extend to both sides, they can be opposed or staggered.

When the one or more branch outlets extend to the right of main line 3, it will be necessary that all pusher elements 28 start their run down the main line along the left-hand side of apron 5. This is accomplished by the provision of a channel shaped guide 29 positioned to receive the guide pin 22 of each successive pusher element 28 with a sliding fit. The channel shaped guide 29 is mounted on angles 30 supported on the frame braces 8. A similar pin guide channel 31 may be mounted by means of angle 32 along the right-hand side of frame 1.

The means by which the Pusher elements 28 are shifted from the left-hand side of apron 5 to the right-hand side thereof to divert a Product onto branch outlet 4 does not constitute a part of the present invention. Briefly, the channel guide 29 for the pusher element guide pins 22 is provided with a switching mechanism diagrammatically indicated at 33 in FIG. 2. The switching mechanism 33 comprises a short section of guide channel (not shown) pivotally mounted and shiftable between a normal position aligned with guide channel 29 and an actuated position adapted to divert a pusher element guide pin 22 to the right of the apron 5, as viewed in the conveying direction A. It will be understood that the switching mechanism 33 will be properly located just upstream of branch outlet 4.

This diversion of the pusher element guide pins 22 will cause their respective pusher elements 28 to begin shifting across apron 5. When the guide pin 22 of each pusher element 28 leaves the pivoted guide channel section, the roller type bearing 24 mounted on the guide pin 22 will engage an angle iron 34 extending diagonally across the frame 1. In FIG. 2, two pusher elements 28 are shown advancing along the angle iron member 34. These Pusher elements will continue along the angle iron member 34 until their respective guide pins 22 enter guide channel 31. The pusher elements will remain on the right-hand side of apron 5 by virtue of their guide pins being located in guide channel 31 until they approach the forward end of the sortation conveyor. At the forward end, means are provided to return all of those pusher elements 28 which have been shifted to the right-hand side of apron 5 back to the left-hand side of apron 5. This will assure that each pusher element 28 begins its flight on the left-hand side of apron 5, as indicated above.

It will be understood that the sortation conveyor 1 will be provided with a number of safety devices to assure that all of the pusher elements 28 have been returned to the left-hand side of apron 5 prior to the beginning of their next flight in the conveying direction. Additional safety means are provided to assure against Pusher element jamming in the switch mechanism 33.

Shifting of the small section of guide channel in switch mechanism 33, between its unactuated and its actuated positions, can be effected by a double-acting fluid cylinder (not shown). The flow of fluid to and from the cylinder is controlled by a solenoid valve (not shown).

Reference is again made to FIG. 1. In this figure, vehicle tire 35 has already been diverted to branch outlet 4 by the pusher elements designated 28a, which are now arranged along the right-hand side of the conveyor apron 5. Vehicle tire 36 has just been diverted onto branch outlet 4 by pusher elements indicated at 28b, also aligned on the right-hand side of apron 5. Vehicle tires 37 and 38 were not selected for diversion and have moved past the branch outlet 4. The pusher elements 28c and 28d which would have diverted tires 37 and 38, if desired, remain aligned on the left-hand edge of apron 5.

The controls of sortation conveyor 1 do not constitute a part of the present invention and have not been illustrated in the figures. While scanning may be accomplished by an operator, the usual practice is to provide the conveyor with an optical or magnetic scanner for reading information on successive products to determine which of the conveyed products are to be diverted. For each product to be diverted, the scanner will transmit a suitable signal to the controller which may constitute a conventional computer. A sensor, such as an electric eye, is set at a predetermined point at the upstream end of the sortation conveyor 1 to note the entry of each successive product onto the sortation conveyor, giving a signal to the controller. If the scanner has signaled that a particular package is to be diverted, the controller responds to the signal from the electric eye by commencing measurement of the travel of the product from the upstream end of the sortation conveyor to the appropriate branch outlet. The purpose of this is to actuate the appropriate solenoid valve at the proper instant when the leading end of the product to be diverted reaches the upstream end of the switch assembly 33 to bring about the diversion. Means are also provided to divert the proper number of pusher elements to complete the operation of pushing the product onto the branch outlet. This may be accomplished, for example, by causing the signal from the sensor or electric eye to include a measurement of the length of the product for use while the product is being diverted.

Figure 16:
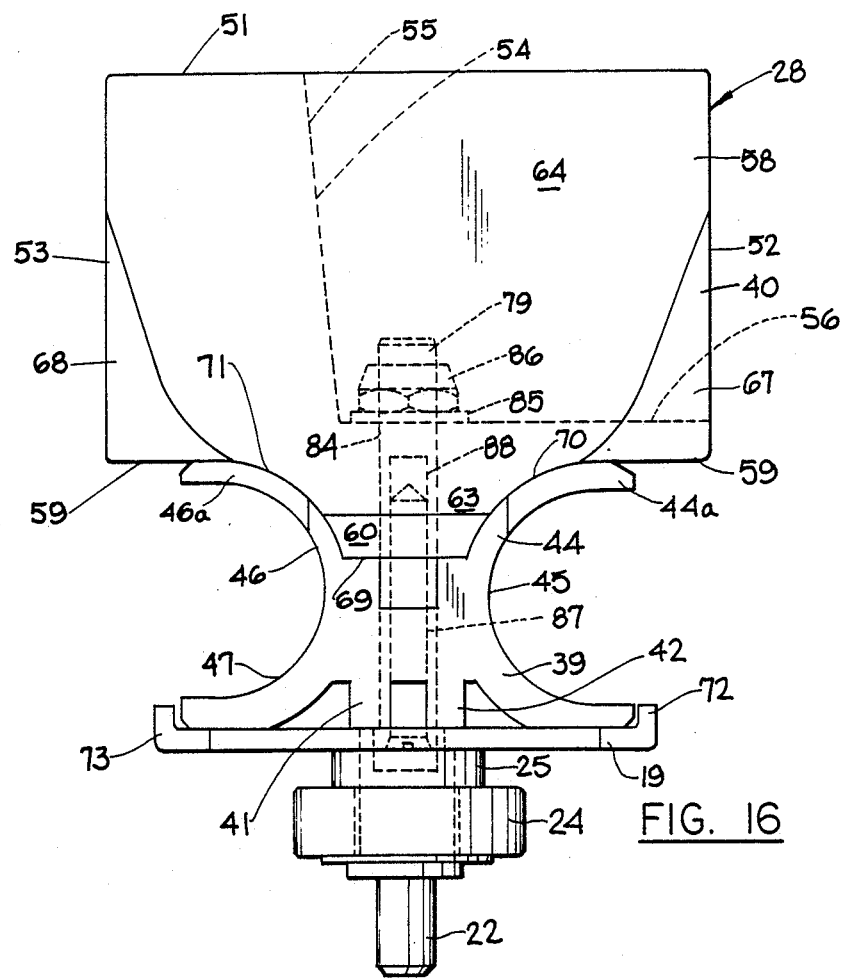
FIG. 16 is a side elevational view of a fully assembled pusher element of the present invention.

Reference is now made to FIG. 16 wherein a fully assembled pusher element 28 of the present invention is illustrated. The pusher element 28 comprises a base 39, a pusher element cap 40, a stiffener plate 19 and a guide pin 22.

The base 39 is illustrated in FIGS. 9, 10 and 11. The base 39 is similar to the prior art base 20 of FIG. 4. The base 39 is an integral one-piece structure which may be made of steel or the like. For weight and economic reasons, it is preferred that the base 39 be made of a plastic material having good antifriction properties such as UHMWPE.

As is most clearly seen from FIG. 11, the base 39 has an H-shaped central body portion made up of vertical leg portions 41 and 42 and an inter-connecting web portion 43. The leg portion 42 carries a forwardly facing arcuate Portion 44 defining a forwardly facing, semi-cylindrical recess 45. Similarly, the leg portion 41 carries a rearwardly facing arcuate portion 46, defining a rearwardly facing, semi-cylindrical recess 47. The recesses 45 and 47 of base 39 are equivalent to the recesses 26 of the base 20 of FIG. 4 and serve the same purpose. In other words, the recesses 45 and 47 form slideways to be received between and slide on a pair of adjacent cross tubes. Since the arcuate portion 44 faces forwardly, it will be subjected to somewhat greater forces than the arcuate portion 46. For this reason, the arcuate portion 44 is slightly thicker than the arcuate portion 46.

As is most clearly shown in FIG. 9, the upper corners of the arcuate portion 44 are cut away or beveled as at 44a and 44b. Similarly, the upper corners of arcuate portion 46 are beveled or cut away as at 46a and 46b. The bevels 44a, 44b, 46a and 46b cause the upper parts of arcuate portions 44 and 46 to conform to the configuration of the pusher cap to be described. The base is completed by the provision of a pair of substantially identical bores 48 and 49, together with a slightly enlarged central bore 50. The purpose of bores 48, 49 and 50 will be apparent hereinafter.

The pusher element cap 40 is illustrated in FIGS. 5 through 8. The cap 40 comprises an integral, one-piece block-like structure which can be made of ABS, wood, rubber, urethane, polyethylene or the like. Preferably, the cap 40 is made of ABS.

The cap 40 has a planar, horizontal top surface 51, a planar vertical forward surface 52 and a planar vertical rearward surface 53. A notch 54 (with a continuous upwardly and outwardly tapered wall 55 and a horizontal, planar bottom 56) is formed in top surface 51 and forward surface 52.

The cap 40 is provided with sides 57 and 58 and a bottom surface 59. The bottom surface 59 has an extension 60 formed thereon which is directed downwardly from bottom surface 59 and extends transversely thereof.

Side 57 has a lower arcuate surface portion 61 which continues into the extension 60. The upper portion of side wall 57 comprises a planar surface 62 which slopes upwardly and inwardly to the top surface 51. The surface portion 62 forms an angle a with the vertical. While any appropriate angle of from about 5° to about 40° may be used, depending upon the application to which the pusher cap is directed, excellent results have been achieved in the shifting of high-friction vehicle tires where angle a has been about 10°.

It will be understood that side 58 constitutes a mirror image of side 57, having a lower arcuate surface portion 63, equivalent to the arcuate surface portion 61 of side 57 and an upper planar surface portion 64 sloping upwardly and inwardly and constituting the equivalent of surface portion 62 of side wall 57.

Figure 5:
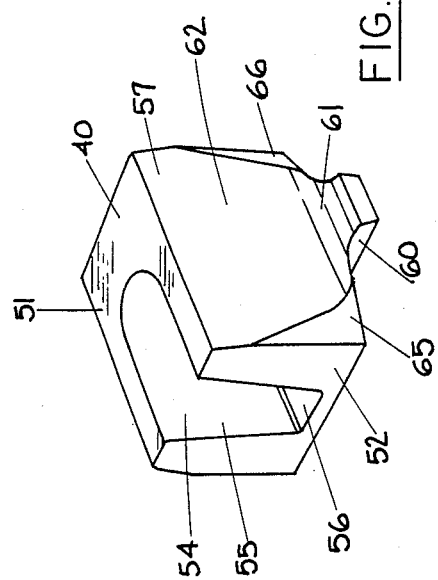
FIG. 5 is a perspective view of the cap of a pusher element of the present invention.
Figure 8:
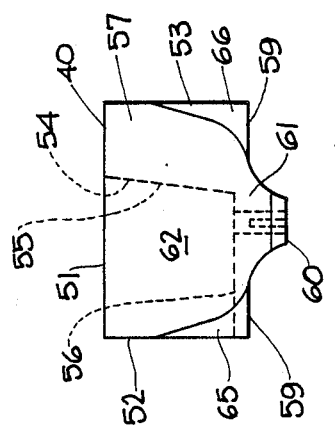
FIG. 8 is a side elevational view of the cap of FIG. 6, as seen from the right of that figure.
Figure 6:
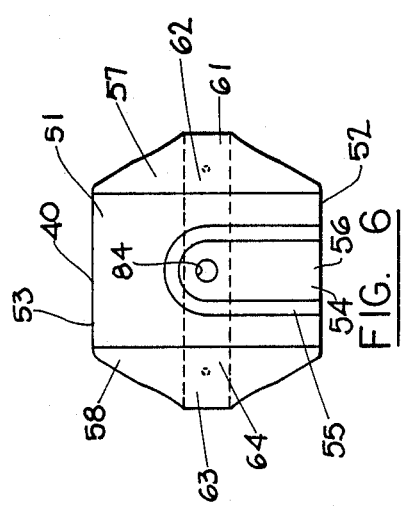
FIG. 6 is a plan view of the cap of FIG. 5.
Figure 7:
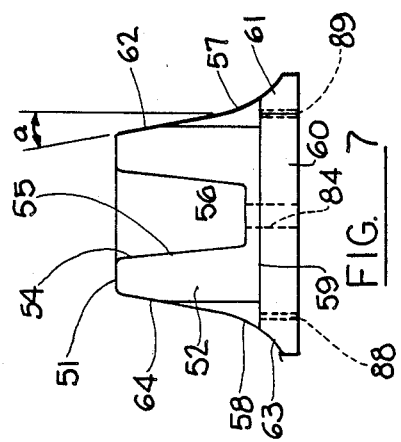
FIG. 7 is a front elevational view of the cap of FIG. 6.

As is most clearly shown in FIGS. 5 and 8, the lower corners of side wall 57 are relieved as at 65 and 66. These reliefs match the reliefs 44b and 46b, respectively, of base member 39. Side wall 58 is best shown in FIG. 16. It will be noted that the lower corners of side wall 58 are relieved as at 67 and 68, matching the reliefs 44a and 46a of base member 39.

It will be noted from FIG. 16 that the lower surface 69 of transverse extension 60 is flat and configured to rest upon the upper ends of base member leg portions 41 and 42. The longitudinal sides 70 and 71 of transverse extension 60 are arcuate so as to rest upon the arcuate portions 44 and 46 of base member 39.

The stiffener plate 19 of the pusher element 28 of FIG. 16 is identical to the stiffener plate 19 of the prior art pusher element 18 of FIG. 4 and is illustrated in FIGS. 14 and 15. Stiffener plate 19 is a planar metallic plate having upturned forward and rearward edges 72 and 73 extending along the forward edges of the arcuate portions 44 and 46 of base member 39. Stiffener plate 19 has a pair of holes 74 and 75 formed therein, together with an enlarged central perforation 76 provided with a flat 77. The purpose of holes 74 and 75 and perforation 76 will be apparent hereinafter.

The guide pin 22 of FIG. 16 is also identical to the prior art guide pin 22 of FIG. 4. Guide pin 22 is more clearly illustrated in FIGS. 12 and 13. Guide pin 22 comprises an elongated shank 78 provided with a threaded portion 79 at one end and a head 80 at the other. The head 80 constitutes a cylindrical portion of larger diameter. Near the juncture of shank 78 and head 80, the head 80 is provided with a flat 81. The other end of head 80 is provided with an annular flange 82. The head 80 and flange 82 terminate in the pin portion 83 of guide pin 22.

Turning to FIG. 16, the parts of pusher element 28 are held together by guide pin 22. To this end, the guide pin shank 78 extends through the perforation 76 in stiffener plate 19 with the guide pin flat 81 cooperating with the stiffener plate flat 77. The guide pin shank 78 further extends through the central perforation 50 of base 39 and through a perforation 84 in cap 40. The uppermost threaded end 79 of guide pin 22 is provided with a washer 85 and a nut 86. Beneath the stiffener plate 19, the head portion 80 of guide pin 22 carries a roller type bearing member 24 and a spacer 25 identical to the elements 24 and 25 of the prior art structure of FIG. 4. In addition, a machine screw 87 (see FIG. 16) extends through the right hand perforation 74 of the stiffener plate 19a of FIG. 14 and through the perforation 48 in base 39 to be threadedly engaged in a threaded perforation 88 in cap 40. Similarly, a second machine screw (not shown) extends through the left-hand perforation 75 of the stiffener plate 19a of FIG. 14 and through the perforation 49 of base 39 into a threaded perforation 89 of cap 40 (see FIG. 7).

In use of the pusher element 28 of FIG. 16 for the sorting of vehicle tires, excellent results have been achieved when the cap 40 has a height of about two and one-half inches above the conveying surface of apron 5. This is substantially twice the height of the cap 21 of the prior art embodiment of FIG. 4. The height of the cap will depend upon the items conveyed. In general, a height of from about 1 to about 6 inches will suffice in most instances. It will be understood that the sides 57 and 58 of pusher element cap 40 are mirror images of each other so that the same cap an be used to divert products from left to right with respect to the apron as well as from right to left. This, of course, depends upon the particular set up of the sortation conveyor being used.

The provision of sides 57 and 58 with curved areas 61 and 63, respectively, followed by sloping areas 62 and 64, respectively, has been found to produce a lifting force in addition to a horizontal force to the product being sorted. Prior art pusher elements of the type shown in FIG. 4 applied only a horizontal force. The provision of an additional lifting force reduces the weight of the vehicle tire on the cross tubes, thereby reducing sliding friction forces between the vehicle tire being diverted and the cross tubes along which it is sliding. This same inclined contour of the sides 57 and 58 has been found to produce a downward force, generated by the vehicle tire itself, to hold the pusher element 28 tightly against the cross tubes supporting it. This counteracts any tendency of the taller contour to lift the slats out of their normal operating positions. Since the inclined surface by means of arcuate portion 61 or 63, continues onto the extension 60, the inclined surface is carried to a Position below the uppermost surfaces of the cross tubes and the conveying surface of the product being diverted. This, in conjunction with the fact that sides 57 and 58 provide a larger contacting surface with the vehicle tire tends to minimize deflection of the vehicle tire, eliminating pinching or binding effects of the vehicle tire between the pusher element 28 and its supporting cross tubes. While excellent results have been achieved with pusher caps having surface portions 62 and 64 inclined at about 10° to the vertical, other inclinations could be used, depending upon the nature of the products being diverted by the pusher elements.

Reference is now made to FIG. 17 wherein a cross tube of the present invention is illustrated and is designated by index numeral 90. The cross tube 90 comprises a steel tube 91 provided with a low-friction coating 92.

The low-friction coating 92 may be of any appropriate type including tungsten disulfide, nitrate base with tungsten disulfide, or polyamide. Excellent results were achieved when sleeves of UHMWPE were tightly pressed and shrunk onto the steel tubes. The UHMWPE sleeves had a thickness of about 1/16 inch. The UHMWPE layer or coating provides low-friction, while the steel tubes, themselves, provide strength and rigidity. Cross tubes so coated eliminated, or markedly reduced, chatter and bouncing of the vehicle tires as they slid along the cross tubes. Furthermore, the coated cross tubes demonstrated excellent release characteristics, preventing the collection of dirt, rubber flashings, and other foreign matter which might cause binding of the pusher elements. Furthermore, the coated cross tubes did not mark the tires such as by scratching or the like, and proved to be corrosion resistant.

From the above, it will be apparent to one skilled in the art that the application of the teachings of the present invention to a sortation conveyor will enable the conveyor to adequately convey and process products characterized by high-friction surfaces. In the description above and in the claims which follow, such words as "forward", "rearward", "upwardly", "downwardly", "vertical", and "horizontal" are used in conjunction with the drawings for purposes of clarity. It will be understood by one skilled in the art that the cross tubes and pusher elements of the sortation conveyor assume various positions during their travels in the conveying direction and in the return direction.

Modifications may be made in the invention without departing from the spirit of it.

What is claimed is:

1. In a sortation conveyor for packages and products, said conveyor comprising a frame defining a main line of the conveyor and at least one branch outlet extending laterally therefrom, an endless conveying apron supported for movement on said frame along said main line and having a top run moveable in the conveying direction and a bottom run moveable in a return direction, said apron comprising a pair of endless chains joined together by a plurality of cross tubes affixed to said chains and extending transversely of said frame in parallel spaced relationship, a plurality of pusher elements, each pusher element being slidably mounted on and between adjacent pairs of cross tubes throughout the length of said apron, said pusher elements being moveable with and by said apron in said conveying direction, and means for shifting a desired number of said pusher elements transversely of said apron along those cross tubes to which they are mounted to divert a desired package or product onto said branch outlet, the improvement comprising a low-friction layer on each of said cross tubes and a package or product contacting cap on each of said pusher elements having at least one package or product contacting surface sloping upwardly and inwardly of said cap to impart to said package or product a lifting force as well as a horizontal force such that the weight of the package or product on said cross tubes and thus the sliding friction forces are reduced whereby said sortation conveyor can accommodate products with high-friction surfaces.

2. The structure claimed in claim 1 wherein said low-friction layer on said cross tubes is chosen from the class consisting of tungsten disulfide, nitrate base with tungsten disulfide, polyamide and UHMWPE.

3. The structure claimed in claim 1 wherein said cross tubes are made of steel.

4. The structure claimed in claim 1 wherein said low-friction layer comprises UHMWPE.

5. The structure claimed in claim 1 wherein said pusher cap is made of a material chosen from the class consisting of wood, rubber, urethane, polyethylene, and ABS.

6. The structure claimed in claim 1 wherein each pusher element cap comprises a block-like structure having a top surface, a bottom, a forward end facing in the conveying direction, a rearward end facing opposite the conveying direction, and a pair of sides, at least one of said sides comprising said package or product contacting surface.

7. The structure claimed in claim 1 wherein said at least one sloping package or product contacting surface lies at an angle to the vertical of from about 5° to about 40°.

8. The structure claimed in claim 1 wherein said at least one sloping package or product contacting surface lies at an angle to the vertical of about 10°.

9. The structure claimed in claim 1 wherein each of said pusher caps has a clear height above said apron of from about 1 inch to about 6 inches.

10. The structure claimed in claim 1 wherein each of said pusher caps has a clear height above said apron of about 2.5 inches.

11. The structure claimed in claim 2 wherein said cross tubes are made of steel.

12. The structure claimed in claim 4 wherein said cross tubes are made of steel.

13. The structure claimed in claim 2 wherein said pusher cap is made of a material chosen from the class consisting of wood, rubber, urethane, polyethylene, and ABS.

14. The structure claimed in claim 1 wherein said pusher element cap is made of ABS.

15. The structure claimed in claim 4 wherein each of said pusher caps has a clear height above said apron of about 2.5 inches.

16. The structure claimed in claim 6 wherein said at least one sloping package or product contacting surface lies at an angle to the vertical of from about 5° to about 40°.

17. The structure claimed in claim 6 wherein said at least one sloping package or product contacting surface lies at an angle to the vertical of about 10°.

18. The structure claimed in claim 6 wherein each of said pusher caps has a clear height above said apron of from about 1 inch to about 6 inches.

19. The structure claimed in claim 6 wherein each of said pusher caps has a clear height above said apron of about 2.5 inches.

20. The structure claimed in claim 6 wherein both sides are package or product contacting surfaces and are mirror images of each other.

21. The structure claimed in claim 6 including an extension on each pusher element cap bottom extending centrally thereof from one of said sides to the other of said sides, and having an end adjacent each of said cap sides, said extension extending downwardly between said cross tubes supporting its respective pusher element, said extension end adjacent said at least one sloping package or product contacting surface curving upwardly to meet and blend with said sloping surface whereby to prevent packages or products from being pinched between each cap and its respective cross tubes.

22. The structure claimed in claim 20 including an extension on each pusher element cap bottom extending centrally thereof from one of said sides to the other of said sides, and having an end adjacent each of said cap sides, said extension extending down between said cross tubes supporting its respective pusher element, said extension ends each curving upwardly to meet and blend with its adjacent sloping package or product contacting surface whereby to prevent packages from being pinched between each cap and its respective cross tubes.

23. The structure claimed in claim 22 wherein each pusher element comprises a cap and a base, said base being slidably mounted on and between said adjacent pair of cross tubes supporting said pusher element, the lower corners of said sloping package or product contacting surfaces and the adjacent portions of said base being relieved.

24. The structure claimed in claim 23 wherein said low-friction layer on said cross tubes is chosen from the class consisting of tungsten disulfide, nitrate base with tungsten disulfide, polyamide and UHMWPE.

* * * * *